United States Patent [19]

Hosoe et al.

[11] Patent Number: 5,531,200
[45] Date of Patent: Jul. 2, 1996

[54] CONTROL APPARATUS FOR ENGINE

[75] Inventors: Katsuharu Hosoe, Okazaki; Toshihisa Yamamoto, Kariya, both of Japan

[73] Assignee: Nippondenso Co., Ltd., Japan

[21] Appl. No.: 352,794

[22] Filed: Dec. 1, 1994

[30] Foreign Application Priority Data

Dec. 1, 1993 [JP] Japan ................................. 5-302088

[51] Int. Cl.⁶ .................................................. F02P 5/152
[52] U.S. Cl. ...................... 123/417; 123/425; 364/431.12
[58] Field of Search ..................................... 123/417, 425, 123/480; 364/431.04, 431.05, 431.08, 431.12

[56] References Cited

U.S. PATENT DOCUMENTS

| | | | |
|---|---|---|---|
| 4,837,454 | 6/1989 | Ishii et al. | 123/417 |
| 4,848,299 | 7/1989 | Satoh et al. | 123/417 |
| 4,936,275 | 6/1990 | Takeda | 123/417 |
| 4,944,271 | 7/1990 | Iwata et al. | 123/417 |
| 4,970,667 | 11/1990 | Abo | 123/417 |
| 5,001,642 | 3/1991 | Botzenhardt et al. | 123/417 |

FOREIGN PATENT DOCUMENTS

0027166  7/1990  Japan .

*Primary Examiner*—Willis R. Wolfe
*Attorney, Agent, or Firm*—Cushman Darby & Cushman

[57] ABSTRACT

An engine control apparatus includes a microcomputer and receives a signal from a signal source which generates a signal containing a control factor. The microcomputer executes a control program in response to the received signal. The engine control apparatus also includes a signal input circuit designed to be selectively connectable with signal sources of various types. A memory is provided for storing control programs corresponding to the signal sources of the various types respectively. A signal source identifying device is provided for identifying a signal source connected with the signal input circuit. A control program executing device selectively executes a control program corresponding to the signal source identified by the signal source identifying device.

14 Claims, 7 Drawing Sheets

CONTROL APPARATUS FOR ENGINE

BACKGROUND OF THE INVENTION

1. Field of the Invention

This invention relates to a control apparatus for an engine powering, for example, an automotive vehicle or a ship.

2. Description of the Prior Art

Regarding engines for ships and automotive vehicles, various sensors and switches have recently been used to generate signals representative of engine operating conditions. The signals generated by the sources are inputted into a microcomputer, and are used in a given control program executed by the microcomputer. In general, the control program has routines directed to different controls such as ignition timing control and fuel injection control.

There are different control routines directed to each of the controls. Further, for each of the controls, the type of control routine executed by the microcomputer depends on the form of signals generated by sources (e.g., various sensors and switches).

For example, engines of one type are subjected to spark timing control including knock control using a knock sensor while engines of another type are subjected to spark timing control including change of a spark advance angle, and entirely unrelated to knock control. Thus, the type of control routine for spark timing control executed by the microcomputer depends on the type of engine controlled thereby.

In some cases, various grades (types) of engines are prepared for one model of an automotive vehicle or a ship. In these cases, even for one model of the automotive vehicle or the ship, the control program required must be changed, depending on the grade of engine actually used.

Thus, it is necessary to prepare different types of control apparatuses, including a microcomputer, according to each of the various control routines and signal sources. Specifically, even for one model of an automotive vehicle or a ship having an engine of a grade arbitrarily selected from among different grades, it is necessary to prepare several different types of control apparatuses. Accordingly, there has been a strong demand for the standardization of control apparatuses.

SUMMARY OF THE INVENTION

It is an object of this invention to provide an improved control apparatus for an engine.

A first aspect of this invention provides an engine control apparatus including a microcomputer which receives a signal from a signal source, the signal containing a control factor, the microcomputer executing a control program in response to the received signal, the apparatus comprising a signal input circuit designed to be selectively connectable with signal sources of plural types; memory means for storing control programs corresponding to the signal sources of the plural types respectively; signal source identifying means for identifying the signal source connected with the signal input circuit; and control program executing means for selectively executing a control program corresponding to the signal source identified by the signal source identifying means.

A second aspect of this invention provides an engine control apparatus including a microcomputer which receives a signal from a signal source, the signal containing a control factor, the microcomputer executing a control program in response to the received signal, the apparatus comprising a signal input circuit designed to be selectively connectable with signal sources of plural types; memory means for storing control programs corresponding to the signal sources of the plural types respectively; an electrically rewritable nonvolatile memory loaded with a control specification constant for identifying a signal source connected with the signal input circuit; and control program executing means for selectively executing a control program corresponding to the control specification constant stored into the electrically rewritable nonvolatile memory.

Further advantages and aspects of the apparatus according to the present invention will become apparent from the subsequent description, the drawings and the claims.

DESCRIPTION OF THE PREFERRED EMBODIMENT

An embodiment of this invention is directed to a spark timing control apparatus for a 4-cylinder spark-ignition gasoline engine. The embodiment of this invention will be described hereinafter.

Figure 1:
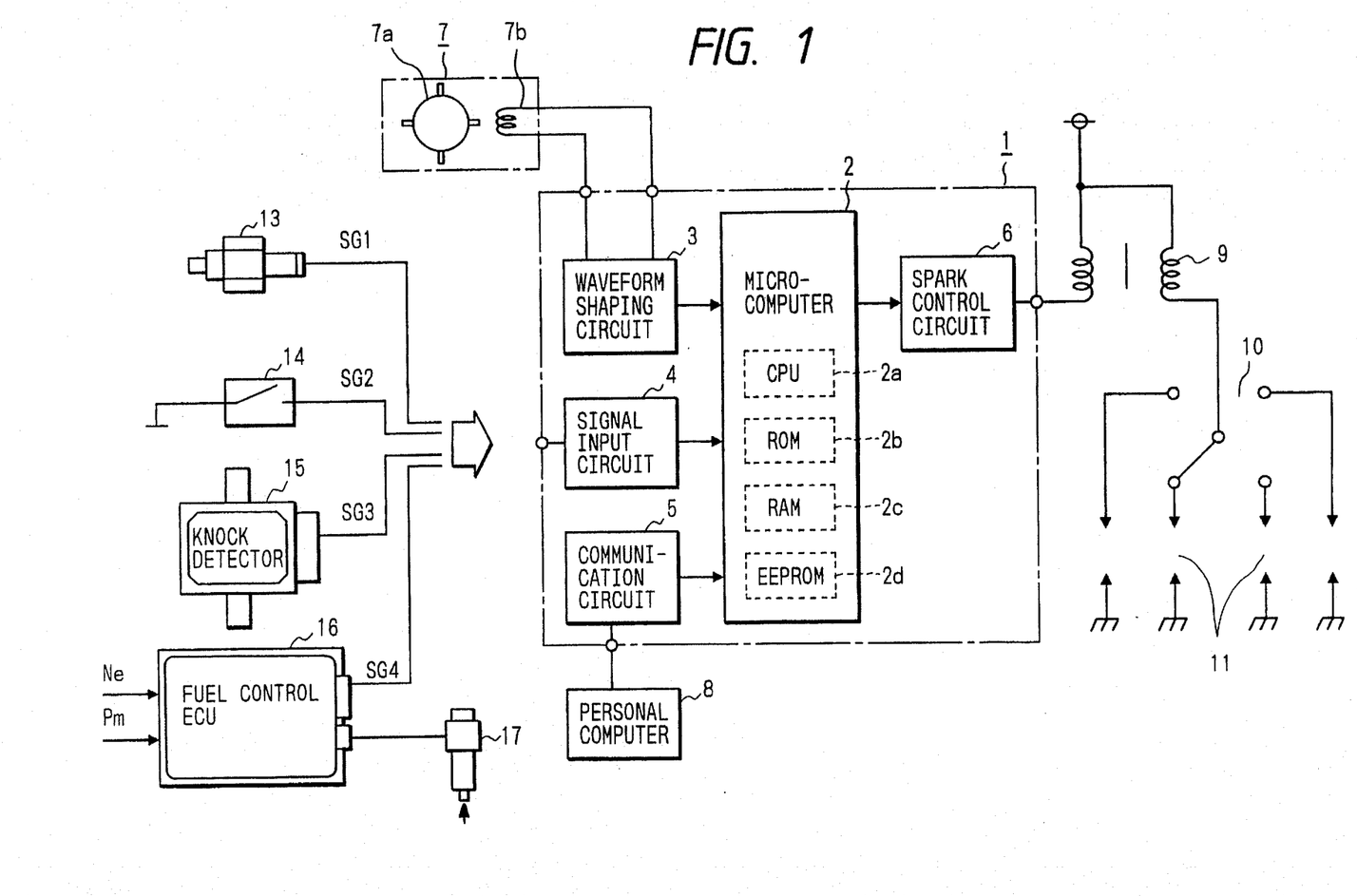
FIG. 1 is a diagram of a spark timing control apparatus according to an embodiment of this invention.

With reference to FIG. 1, the spark timing control apparatus of this embodiment includes an electronic control unit (ECU) 1 for spark control which has a microcomputer 2, a waveform shaping circuit 3, a signal input circuit 4, a communication circuit 5, and a spark control circuit 6. The electronic control unit 1 is also referred to as the spark control ECU 1.

The microcomputer 2 includes a CPU 2a, a ROM (read only memory) 2b, a RAM (random access memory) 2c, and an EEPROM (electrically erasable and programmable read only memory) 2d. The CPU 2a executes a control program. The ROM 2b uses, for example, a mask ROM. The ROM 2b stores the control program and initial data. The RAM 2c temporarily stores various input signals and data necessary for calculation. The EEPROM 2d serves as a nonvolatile memory.

In this embodiment, the CPU 2a forms a signal source identifying section and a program executing section while the ROM 2b forms a memory section.

The waveform shaping circuit 3 receives a detection signal from a rotation sensor 7, and shapes the waveform of the detection signal to generate a rotation pulse signal. The rotation pulse signal has pulses corresponding to the respective engine cylinders and spaced at equal angular intervals (180° CA in the case of the 4-cylinder engine, where CA denotes crank angle). The rotation pulse signal has a waveform such as shown in the part (a) of FIG. 2.

The rotation sensor 7 includes a rotor 7a and a magnetic pickup 7b. The rotor 7a is mounted on the crankshaft or the camshaft of the engine. The magnetic pickup 7b cooperates with the rotor 7a.

The signal input circuit 4 is connected to a signal source for outputting a signal containing a control factor. The signal input circuit 4 transmits the output signal of the signal source to the microcomputer 2. It should be noted that the control factor means a parameter used in calculation for spark timing control by the microcomputer 2.

One of a pressure switch 13, an octane number switch 14, a knock detector 15, and an electronic control unit (ECU) 16 for fuel control is provided as the signal source connected to the signal input circuit 4. The electronic control unit 16 is also referred to as the fuel control ECU 16. The signal source connected to the input circuit 4 will be described in more detail later.

An external device or a personal computer 8 is connected to the communication circuit 5. The external device 8 serves to rewrite or update data in the EEPROM 2d of the microcomputer 2. The communication circuit 5 implements communication between the external device 8 and the microcomputer 2.

The spark control circuit 6 energizes and deenergizes an ignition coil 9 in response to an ignition signal fed from the microcomputer 2. The energization and deenergization of the ignition coil 9 cause high-voltage pulses, which are sequentially fed via a distributor 10 to spark plugs 11 in the respective engine cylinders.

Figure 2:
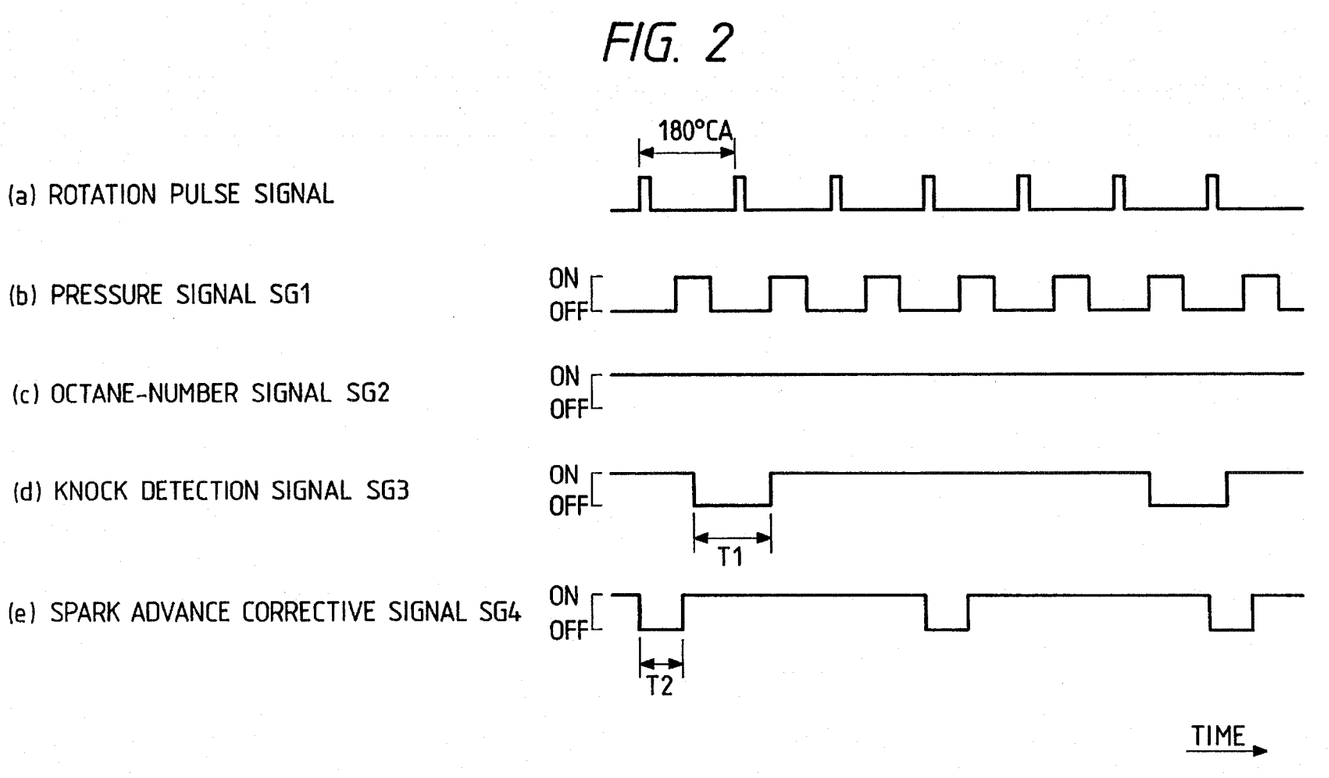
FIG. 2 is a time-domain diagram of the output signals of various signal sources.

The signal source connected to the signal input circuit 4 will now be described in detail with reference to FIGS. 1 and 2. In this embodiment, the signal source is selected from among the pressure switch 13, the octane number switch 14, the knock detector 15, and the fuel control ECU 16. In other words, only one of the pressure switch 13, the octane number switch 14, the knock detector 15, and the fuel control ECU 16 is provided as the signal source.

The pressure switch 13 outputs a binary pressure signal SG1 which changes between an on state and an off state in response to the pressure within an engine intake manifold (the intake air pressure). Specifically, the pressure sensor SG1 assumes the on state when the intake air pressure is equal to or higher than a preset level. The pressure signal SG1 assumes the off state when the intake air pressure is lower than the preset level. Since the intake air pressure depends on the engine load, the pressure signal SG1 represents the engine load. During steady operating conditions of the engine, the pressure signal SG1 remains in either the on state or the off state. During a start of the engine or transitional operating conditions of the engine, the pressure signal SG1 alternates between the on state and the off state at a period corresponding to the ignition period (180° CA) due to the intake air pulsation as shown in the part (b) of FIG. 2.

When the actually-connected signal source is detected or identified as the pressure switch 13 and the microcomputer 2 receives the pressure signal SG1 via the signal input circuit 4, the microcomputer 2 controls the spark timing through MBT control for finding an MBT (minimum spark advance for best torque) and change of a basic spark advance in response to the engine load. It should be noted that the pressure signal SG1 represents the engine load.

The octane number switch 14 outputs a binary octane number signal SG2 which changes between an on state and an off state in response to the octane number of fuel (gasoline) within a fuel tank. Specifically, the octane number signal SG2 assumes the on state when the fuel is high octane number gasoline, for example, when the octane number of the fuel is equal to or higher than 92. The octane number signal SG2 assumes the off state when the fuel is low octane number gasoline, for example, when the octane number of the fuel is lower than 92. Upon the feed of fuel to the fuel tank, one of the on state and the off state of the octane number signal SG2 is selected in response to the octane number of the fuel. Thereafter, as shown in the part (c) of FIG. 2, the state of the octane number signal SG2 remains unchanged until the feed of new fuel to the fuel tank.

When the actually-connected signal source is detected or identified as the octane number switch 14 and the microcomputer 2 receives the octane number signal SG2 via the signal input circuit 4, the microcomputer 2 controls the spark timing through MBT control and change of the basic spark advance in response to the fuel octane number.

The knock detector 15 includes a knock sensor (not shown) for detecting vibration developed in the engine and converting the detected vibration into a corresponding electric signal. The knock detector 15 includes a deciding section for determining whether a knock is present in or absent from the engine in response to the electric signal outputted by the knock sensor. The knock detector 15 outputs a binary knock detection signal SG3 in response to the result of the determination as to the presence of a knock. The knock detection signal SG3 changes between an on state and an off state in accordance with the presence and the absence of a knock. Specifically, as shown in the part (d) of FIG. 2, the knock detection signal SG3 falls into and then remains in the off state for only a preset time T1 in the case where the presence of a knock is detected.

When the actually-connected signal source is detected or identified as the knock detector 15 and the microcomputer 2 receives the knock detection signal SG3 via the signal input circuit 4, the microcomputer 2 executes knock control by which the spark timing is advanced and retarded in response to the presence and the absence of a knock.

The fuel control ECU 16 is connected to a fuel injection valve or valves 17. The fuel injection valve 17 serves to inject fuel into the engine. The fuel control ECU 16 is informed of the engine speed Ne and the intake air pressure Pm as an indication of the engine load. The engine speed Ne means the rotational speed of the engine crankshaft. The fuel control ECU 16 adjusts the fuel injection via the fuel injection valve 17 in response to the engine load. Furthermore, the fuel control ECU 16 generates a binary spark advance corrective signal SG4 in response to the engine load. As shown in the part (e) of FIG. 2, the spark advance corrective signal SG4 has off-state pulses, at least one of which occurs during each rotation of the engine crankshaft. The spark advance corrective signal SG4 periodically falls into and then remains in the off state for a time T2 responsive to a spark advance corrective amount. For example, the spark advance corrective amount represented by the spark advance corrective signal SG4 decreases as the engine load increases.

It is preferable that the maximum value of the duration time T2 of a pulse in the spark advance corrective signal SG4 is shorter than the duration time T1 of a pulse in the knock detection signal SG3.

When the actually-connected signal source is detected or identified as the fuel control ECU 16 and the microcomputer 2 receives the spark advance corrective signal SG4 via the signal input circuit 4, the microcomputer 2 advances and retards the spark timing in response to the spark advance corrective signal SG4.

The microcomputer 2 identifies or determines which of the signals SG1, SG2, SG3, and SG4 agrees with the output signal of the signal source actually connected to the signal input circuit 4. In other words, the microcomputer 2 identifies or determines which of the pressure switch 13, the octane number switch 14, the knock detector 15, and the fuel control ECU 16 agrees with the signal source actually connected to the signal input circuit 4. A description will now be given of a structure which enables the identifying process. Preset identification constants are assigned to the signals SG1, SG2, SG3, and SG4, that is, the pressure switch 13, the octane number switch 14, the knock detector 15, and the fuel control ECU 16, respectively. Data representing one of the identification constants which corresponds to the actually-connected signal source is stored into the EEPROM 2d of the microcomputer 2 by the personal computer 8. Specifically, data representing the identification constant for the pressure signal SG1 is stored into the EEPROM 2d when the pressure switch 13 is provided as the signal source. Data representing the identification constant for the octane number signal SG2 is stored into the EEPROM 2d when the octane number switch 14 is provided as the signal source. Data representing the identification constant for the knock detection signal SG3 is stored into the EEPROM 2d when the knock detector 15 is provided as the signal source. Data representing the identification constant for the spark advance corrective signal SG4 is stored into the EEPROM 2d when the fuel control ECU 16 is provided as the signal source. The CPU 2a of the microcomputer 2 identifies the currently-inputted signal from among the signals SG1, SG2, SG3, and SG4 by referring to the identification-constant data in the EEPROM 2d.

The microcomputer 2 is of the 8-bit type, and each of the identification constants is indicated by 8 bits or 16 bits. In this embodiment, the identification constants for the pressure switch 13 and the octane number switch 14 are equal to "$00" where "$" means that the following numeral is expressed in hexadecimal notation. In addition, the identification constant for the knock detector 15 is equal to "$F0" while the identification constant for the fuel control ECU 16 is equal to "$0F".

In this embodiment, the identification constants for the pressure switch 13 and the octane number switch 14 are equal to each other. The reason for this setting is as follows. Since the pressure switch 13 is turned on and off in response to the intake air pressure, a change of the state of the pressure signal SG1 occurs simultaneously with the engine start. Since the state of the octane number switch 14 remains unchanged as long as the octane number of fuel does not change, the octane number signal SG2 continues to be in one of the on state and the off state during normal operating conditions of the engine. Therefore, the discrimination between the pressure signal SG1 and the octane number signal SG2 can be easily and quickly executed by referring to the duration time of the on state or the off state of a related input signal, that is, the period of the state change of the input signal, immediately after the engine start.

Figure 3:
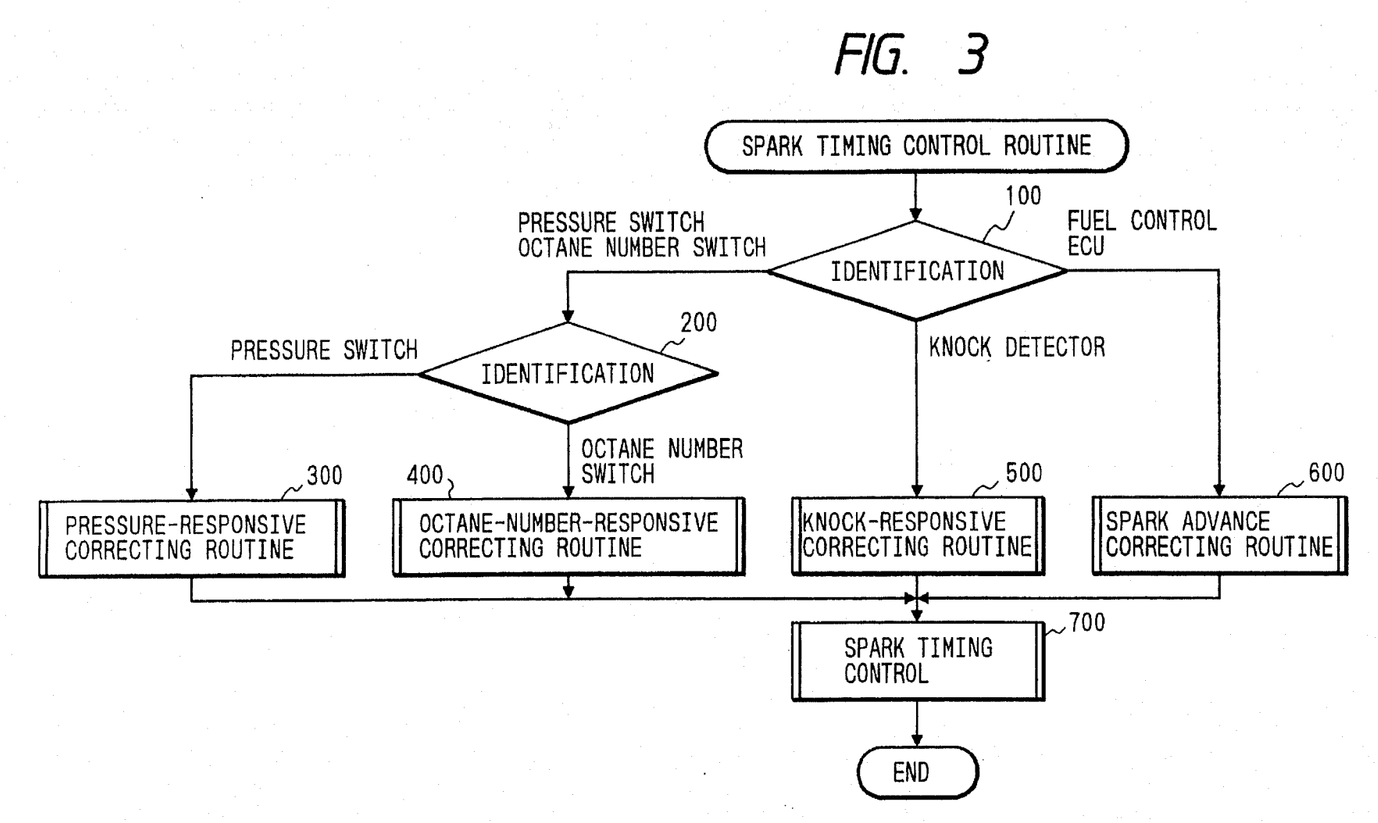
FIG. 3 is a flowchart of a spark timing control routine executed by a CPU within a microcomputer in FIG. 1.

Operation of the spark timing control apparatus will be described hereinafter with reference to FIGS. 3–7. The CPU 2a of the microcomputer 2 executes a control program divided into various routines including a spark time control routine. At a start of the execution of the control program, variables used in the control program are initialized to, for example, "0". FIG. 3 is a flowchart of the spark timing control routine. The spark timing control routine is iteratively executed at the ignition period (the 180° CA period in the case of the 4-cylinder engine).

As will be made clear later, the spark timing control routine has different subroutines corresponding to the pressure switch 13, the octane number switch 14, the knock detector 15, and the fuel control ECU 16. Identification is made as to which of the devices 13, 14, 15, and 16 is provided as the signal source connected to the signal input circuit 4. One of the subroutines which corresponds to the actually-connected signal source is selected in accordance with a result of the identification. Only the selected subroutine is executed while the other subroutines remain unexecuted.

When the spark timing control routine of FIG. 3 is called, the CPU 2a executes a step 100. Specifically, the step 100 reads out the identification-constant data from the EEPROM 2d. The step 100 determines which of "$00", "$F0", and "$0F" the identification constant represented by the readout identification-constant data is equal to. When the identification constant is equal to "$00", that is, when the identification constant corresponds to the pressure switch 13 or the octane number switch 14, the program advances from the step 100 to a step 200. When the identification constant is equal to "$F0", that is, when the identification constant corresponds to the knock detector 15, the program advances from the step 100 to a block 500. When the identification constant is equal to "$0F", that is, when the identification constant corresponds to the fuel control ECU 16, the program advances from the step 100 to a block 600.

The step 200 detects the period of the state change in the currently-inputted signal, and determines whether the currently-inputted signal agrees with the pressure signal SG1 or the octane number signal SG2 in response to the detected period. When the currently-inputted signal agrees with the pressure signal SG1, the program advances from the step 200 to a block 300. When the currently-inputted signal agrees with the octane number signal SG2, the program advances from the step 200 to a block 400.

In this way, the CPU 2a selects and executes one of the blocks 300, 400, 500, and 600 in accordance with which of the pressure switch 13, the octane number switch 14, the knock detector 15, and the fuel control ECU 16 is provided as the signal source connected to the signal input circuit 4. The blocks 300, 400, 500, and 600 are directed to different subroutines, that is, a pressure-responsive correcting routine, an octane-number-responsive correcting routine, a knock-responsive correcting routine, and a spark advance correcting routine, respectively. Thus, the CPU 2a executes the pressure-responsive correcting routine 300 when the signal source agrees with the pressure switch 13. The CPU 2a executes the octane-number-responsive correcting routine 400 when the signal source agrees with the octane number switch 14. The CPU 2a executes the knock-responsive correcting routine 500 when the signal source agrees with the knock detector 15. The CPU 2a executes the spark advance correcting routine 600 when the signal source agrees with the fuel control ECU 16.

A step 700 following the blocks 300, 400, 500, and 600 calculates or determines a final desired spark timing AESA in response to the result of the correcting routine executed at one of the blocks 300, 400, 500, and 600. The step 700 actuates the spark control circuit 6 in response to the final desired spark timing AESA so that actual ignition will occur at a timing equal to the desired timing AESA. In the step 700, the final desired spark timing AESA is determined by adding a basic spark advance value ABse and various spark timing corrective terms or values (an MBT corrective term AMBT, a knock-responsive corrective term AKCS, and a spark advance corrective term AEFI). In other words, the final desired spark timing AESA is calculated according to the equation as "AESA=ABse+AMBT+AKCS+AEFI". After the step 700, the current execution cycle of the spark timing control routine ends.

Figure 4:
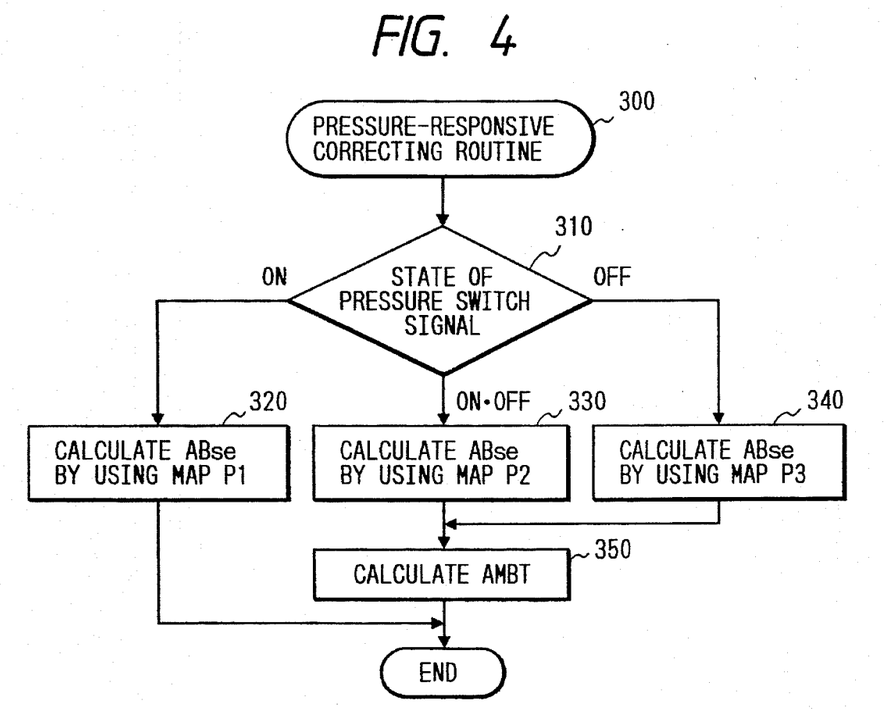
FIG. 4 is a flowchart of a pressure-responsive correcting routine in a block of FIG. 3.

As shown in FIG. 4, a first step 310 of the pressure-responsive correcting routine 300 detects conditions of the state of the output signal SG1 of the pressure switch 13 to determine conditions of the engine load. Specifically, the step 310 determines whether or not the pressure signal SG1 remains in the on state for a given time, that is, whether or not the engine is subjected to a great load. When the pressure signal SG1 remains in the on state for the given time, that is, when the engine is subjected to a great load, the program advances from the step 310 to a step 320. In addition, the step 310 determines whether or not the pressure signal SG1 alternates between the on state and the off state, that is, whether or not the engine load undergoes pulsation. Such a pulsating condition appears at the engine start. When the pressure signal SG1 alternates between the on state and the off state, that is, when the engine load undergoes pulsation, the program advances from the step 310 to a step 330. Furthermore, the step 310 determines whether or not the pressure signal SG1 remains in the off state for a given time, that is, whether or not the engine is subjected to a small load. When the pressure signal SG1 remains in the off state for the given time, that is, when the engine is subjected to a small load, the program advances from the step 310 to a step 340.

Figure 8:
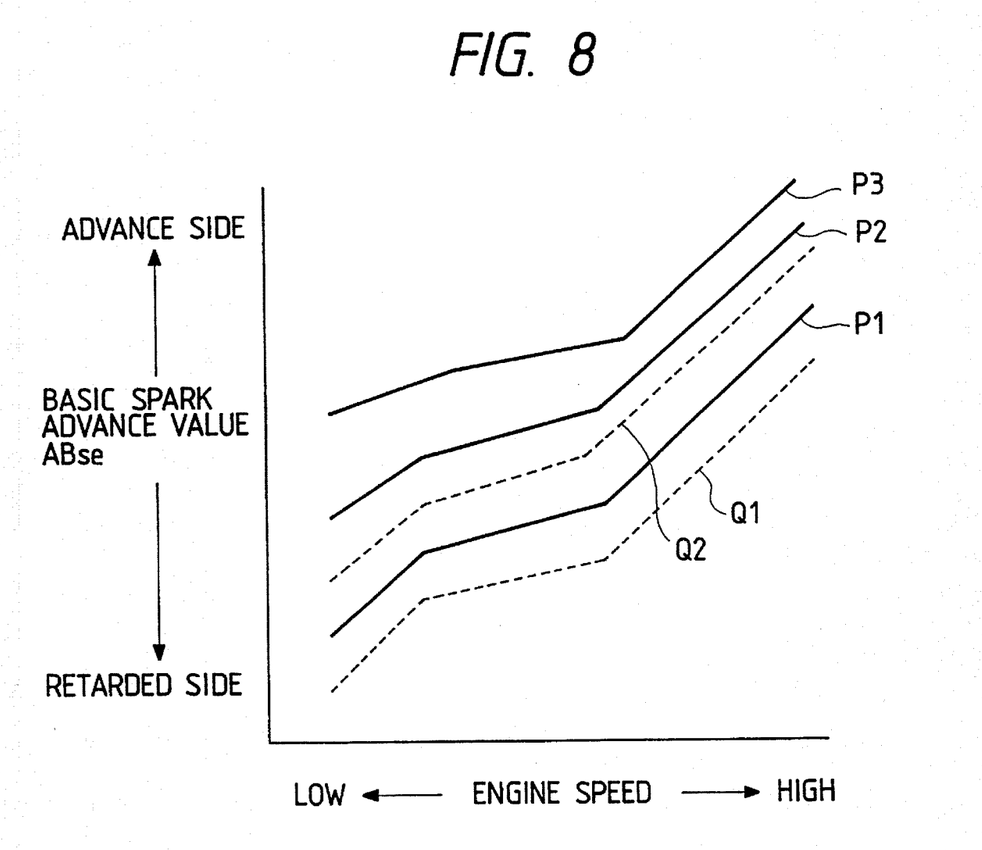
FIG. 8 is a diagram of maps providing predetermined relations between an engine speed and a basic spark advance value in the apparatus of FIG. 1.

The step 320 derives the current engine speed Ne from the output signal of an engine speed detector (not shown). The step 320 determines a basic spark advance value ABse in response to the current engine speed Ne by referring to a map characteristic P1 which provides a predetermined relation between the basic spark advance value ABse and the engine speed Ne. The map characteristic P1 is shown in FIG. 8. The step 320 is followed by the step 700 of FIG. 3.

The step 330 derives the current engine speed Ne from the output signal of the engine speed detector (not shown). The step 330 determines the basic spark advance value ABse in response to the current engine speed Ne by referring to a map characteristic P2 which provides a predetermined relation between the basic spark advance value ABse and the engine speed Ne. The map characteristic P2 is shown in FIG. 8. After the step 330, the program advances to a step 350.

The step 340 derives the current engine speed Ne from the output signal of the engine speed detector (not shown). The step 340 determines the basic spark advance value ABse in response to the current engine speed Ne by referring to a map characteristic P3 which provides a predetermined relation between the basic spark advance value ABse and the engine speed Ne. The map characteristic P3 is shown in FIG. 8. After the step 340, the program advances to the step 350.

The step 350 searches for an MBT (minimum spark advance for best torque) by gradually advancing the spark timing, and determines or calculates an MBT corrective term AMBT for attaining the MBT. The step 350 is followed by the step 700 of FIG. 3.

FIG. 8 shows map characteristics Q1 and Q2 in addition to the map characteristics P1, P2, and P3 which relate to the pressure-responsive correction. As will be made clear later, the map characteristics Q1 and Q2 relate to octane-number-responsive correction. As shown in FIG. 8, the map characteristics P1, P2, P3, Q1, and Q2 correspond to more advanced sides in the order as "Q1→P1→Q2→P2→P3".

As understood from the previous description, in the pressure-responsive correcting routine of FIG. 4, one of the different map characteristics P1, P2, and P3 is selected in response to the conditions of the output signal SG1 of the pressure switch 13, and the basic spark advance value ABse is determined in accordance with the selected map characteristic. In the case of engine load ranges except a high engine load range, the MBT corrective term AMBT is also determined. Generally, in a high engine load range, since a knock limit is in a more retarded side than an optimal spark timing (that is, the MBT), a knock tends to occur if the MBT control is carried out. Accordingly, in a high engine load range, the MBT control is suspended in response to the output signal SG1 of the pressure switch 13.

Figure 5:
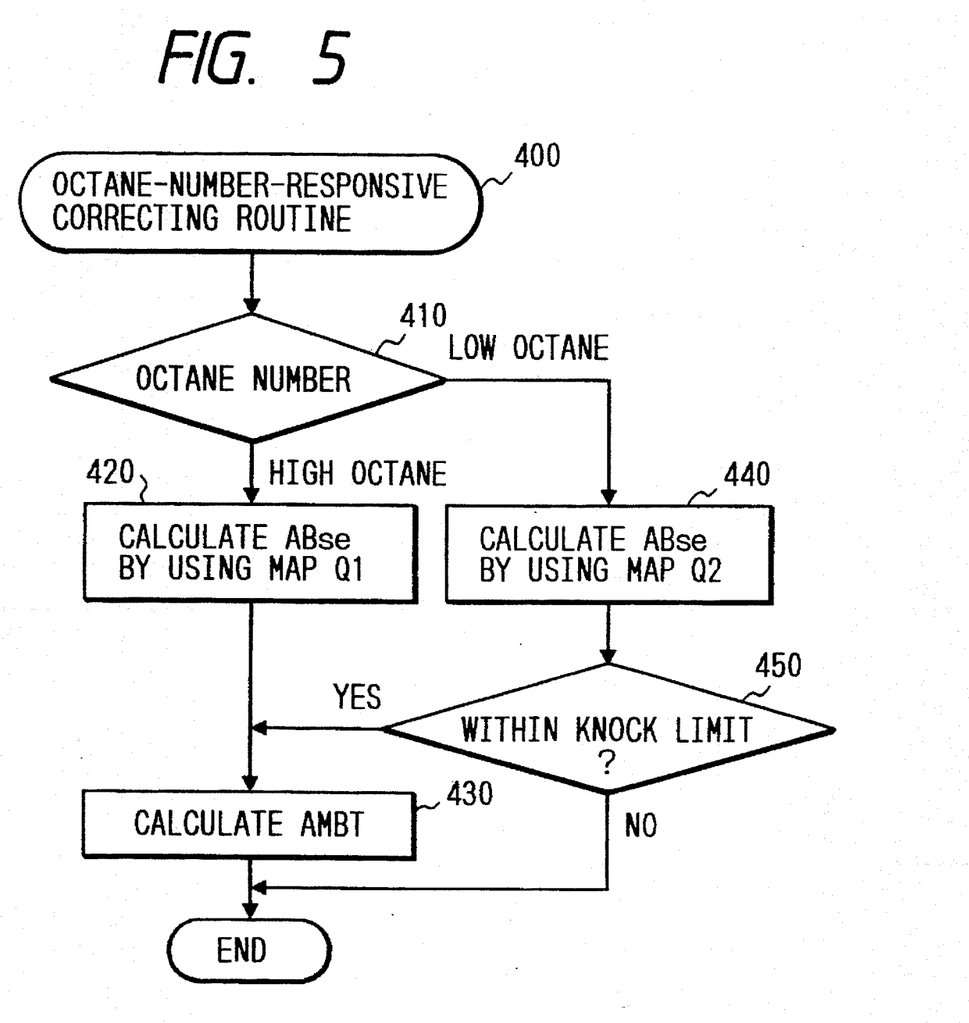
FIG. 5 is a flowchart of an octane-number-responsive correcting routine in a block of FIG. 3.

As shown in FIG. 5, a first step 410 of the octane-number-responsive correcting routine 400 determines whether currently-used fuel agrees with high octane number gasoline or low octane number gasoline in response to the output signal SG2 of the octane number switch 14. When the currently-used fuel agrees with high octane number gasoline, the program advances from the step 410 to a step 420. When the currently-used fuel agrees with low octane number gasoline, the program advances from the step 410 to a step 440.

The step 420 derives the current engine speed Ne from the output signal of the engine speed detector (not shown). The step 420 determines the basic spark advance value ABse in response to the current engine speed Ne by referring to a map characteristic Q1 which provides a predetermined relation between the basic spark advance value ABse and the engine speed Ne. The map characteristic Q1 is shown in FIG. 8. After the step 420, the program advances to a step 430.

The step 440 derives the current engine speed Ne from the output signal of the engine speed detector (not shown). The step 440 determines the basic spark advance value ABse in response to the current engine speed Ne by referring to a map characteristic Q2 which provides a predetermined relation between the basic spark advance value ABse and the engine speed Ne. The map characteristic Q2 is shown in FIG. 8. After the step 440, the program advances to a step 450.

The step 450 compares the current engine speed Ne with a knock limit engine speed. When the current engine speed Ne is equal to or lower than the knock limit engine speed, the program advances from the step 450 to the step 430. When the current engine speed Ne exceeds the knock limit engine speed, the program advances from the step 450 to the step 700 of FIG. 3.

The step 430 searches for the MBT (minimum spark advance for best torque) by gradually advancing the spark timing, and determines or calculates the MBT corrective term AMBT for attaining the MBT. The step 430 is followed by the step 700 of FIG. 3.

According to the octane-number-responsive correcting routine 400 of FIG. 5, one of the different map characteristics Q1 and Q2 is selected in response to whether the octane number of the currently-used fuel is high or low, and the basic spark advance value ABse is determined in accordance with the selected map characteristic. In the case of low octane number gasoline, since its knock limit is generally in a remarkably retarded side, the MBT control is executed only when the current engine speed is equal to or lower than the knock limit engine speed.

Figure 6:
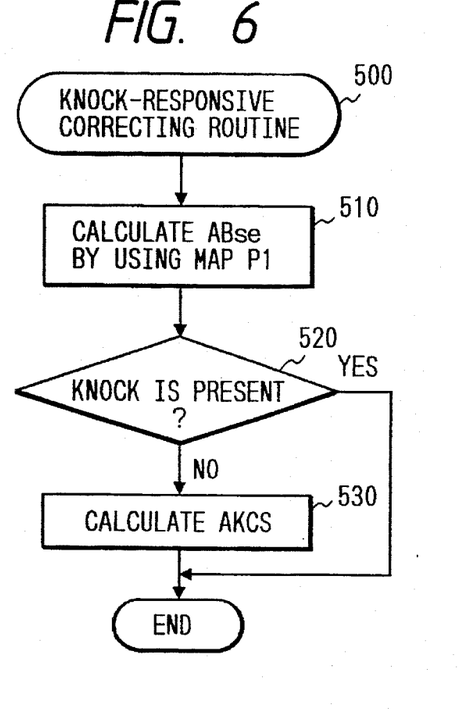
FIG. 6 is a flowchart of a knock-responsive correcting routine in a block of FIG. 3.

According to the knock-responsive correcting routine 500 of FIG. 6, a first step 510 thereof derives the current engine speed Ne from the output signal of the engine speed detector (not shown). The step 510 determines the basic spark advance value ABse in response to the current engine speed Ne by referring to the map characteristic P1 which provides the predetermined relation between the basic spark advance value ABse and the engine speed Ne. The map characteristic P1 is shown in FIG. 8.

A step 520 following the step 510 determines whether a knock is present or absent in response to the output signal SG3 of the knock detector 15. In the presence of a knock, the program advances from the step 520 to the step 700 of FIG. 3. In the absence of a knock, the program advances from the step 520 to a step 530.

The step 530 enables the execution of the knock control in every operating range of the engine. Specifically, the step 530 calculates or determines a knock-responsive corrective term AKCS. After the step 530, the program advances to the step 700 of FIG. 3.

The knock-responsive correcting routine 500 of FIG. 6 may be modified as follows. When a knock is absent, the MBT control is executed. Upon the occurrence of a knock, the MBT control is suspended and the knock control is started therefor.

Figure 7:
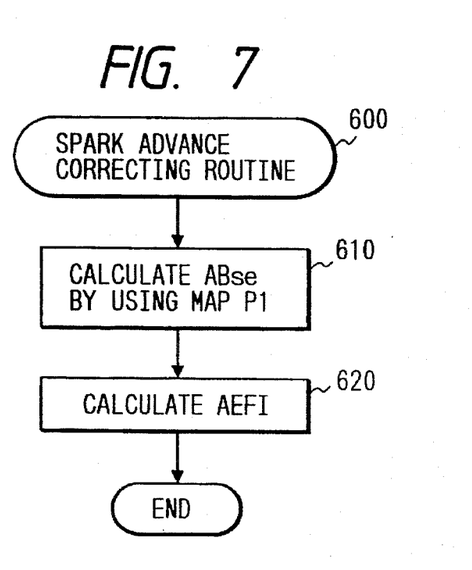
FIG. 7 is a flowchart of a spark advance correcting routine in a block of FIG. 3.

According to the spark advance correcting routine 600 of FIG. 7, a first step 610 thereof derives the current engine speed Ne from the output signal of the engine speed detector (not shown). The step 610 determines the basic spark advance value ABse in response to the current engine speed Ne by referring to the map characteristic P1 which provides the predetermined relation between the basic spark advance value ABse and the engine speed Ne. The map characteristic P1 is shown in FIG. 8.

A step 620 following the step 6 10 calculates or determines a spark advance corrective term AEFI in response to the output signal SG4 of the fuel control ECU 16. After the step 620, the program advances to the step 700 of FIG. 3.

The spark advance correcting routine 600 of FIG. 7 may be modified as follows. The current engine load is detected from the spark advance corrective signal SG4, and a decision is made as to whether or not the engine is in load ranges except a high load range in response to the detected current engine load. It should be noted that the spark advance corrective signal SG4 depends on the engine load. Only when the engine is in the load ranges except the high load range, the MBT control is executed.

As previously described, in the spark timing control apparatus of this embodiment, any one of the pressure switch 13, the octane number switch 14, the knock detector 15, and the fuel control ECU 16 can be set as a source for generating a signal containing a control factor. The ROM 2b stores a plurality of different program segments (different routines) corresponding to the pressure switch 13, the octane number switch 14, the knock detector 15, and the fuel control ECU 16 respectively. The EEPROM (nonvolatile memory) 2d is loaded with data of an identification constant for identifying the signal source, that is, determining which of the pressure switch 13, the octane number switch 14, the knock detector 15, and the fuel control ECU 16 the signal source agrees with. The CPU 2a executes identification of the signal source by referring to the identification-constant data in the EEPROM (nonvolatile memory) 2d and also analyzing conditions of the output signal of the signal source. Then, the CPU 2a selects one of the different routines which corresponds to the identified signal source, and executes the selected routine.

The spark timing control apparatus of this embodiment has the following advantages. The engine grade can be changed among a first grade using the pressure switch 13, a second grade using the octane number switch 14, a third grade using the knock detector 15, and a fourth grade using the fuel control ECU 16. The spark timing control apparatus of this embodiment stores different control routines corresponding to the four different engine grades respectively. The spark timing control apparatus selects one of the different control routines which corresponds to the grade of a related engine. Then, the spark timing control apparatus executes the selected control routine. Accordingly, the spark timing control apparatus of this embodiment can be applied to each of the four different engine grades without charge of the structure thereof.

As previously described, the identification of the signal source is executed by referring to the identification-constant data in the EEPROM 2d. This design enables the identification to be quickly completed, and the control routine corresponding to the identified signal source can be promptly started.

The embodiment of this invention may be modified in various ways. While the identification of the signal source is executed in response to the identification-constant data in the EEPROM 2d in the embodiment of this invention, it is good to additionally implement identification of the signal source in response to the form (waveform) of the output signal of the signal source. Regarding the knock detection signal SG3 and the spark advance corrective signal SG4, the maximum value of the duration time T2 of a pulse in the spark advance corrective signal SG4 is shorter than the duration time T1 of a pulse in the knock detection signal SG3. Accordingly, the two signals SG3 and SG4 can be identified by comparing the related duration times T1 and T2 with a predetermined reference time. The additional identification can be executed by using such a process.

The additional identification enables detection of a disagreement between the signal source and the selected control routine as follows. When the EEPROM 2d is loaded with data representing a wrong identification constant or when an undesired device is erroneously connected to the signal input circuit 4 as a signal source, there occurs a disagreement between the signal source and the identification-constant data in the EEPROM 2d. Such a disagreement is detected through the execution of the additional identification. It is preferable that a correct control routine is selected in response to the result of the additional identification or the related control routine is stopped to avoid the execution of wrong control when the disagreement is detected.

Both a good control reliability and a good control rapidity can be attained in the case where the signal-source identification responsive to the form (waveform) of the output signal of the signal source is executed only at the engine start, and the signal-source identification responsive to the identification-constant data in the EEPROM 2d is executed during other normal operating conditions of the engine.

While the EEPROM 2d is used as a nonvolatile memory in the embodiment of this invention, an EPROM (electrically programmable read only memory) or an EAROM (electrically alterable read only memory) may be used as a nonvolatile memory.

While the identification of the signal source is executed in response to the identification-constant data in the EEPROM 2d in the embodiment of this invention, the EEPROM 2d may be removed. In this case, conditions of the output signal of the signal source are analyzed, and the identification of the signal source is executed in response to the result of the analysis.

As previously described, the pressure switch 13, the octane number switch 14, the knock detector 15, and the fuel control ECU 16 output the digital signals. While one of the pressure switch 13, the octane number switch 14, the knock detector 15, and the fuel control ECU 16 can be provided as a signal source in the embodiment of this invention, one of devices and sensors outputting analog signals may be provided as a signal source. In this case, the analog output signal is changed by an A/D converter into a corresponding digital signal, and the digital signal is fed to the microcomputer 2.

While the embodiment of this invention is directed to the spark timing control apparatus, this invention may be applied to a fuel injection control apparatus. In this case, one of the pressure switch 13, the octane number switch 14, and the knock detector 15 can be provided as a signal source, and the ROM 2b within the microcomputer 2 stores different fuel injection control routines corresponding to the devices 13, 14, and 15 respectively.

What is claimed is:

1. An engine control apparatus including a microcomputer which receives a signal from a signal source, the apparatus comprising:

a signal input circuit selectively connectable with signal sources of plural types;

memory means for storing control programs corresponding to the signal sources of the plural types respectively;

an electrically rewritable nonvolatile memory loaded with a control specification constant indicating a signal source connected with the signal input circuit;

signal characteristic discriminating means for discriminating a characteristic of a signal from the connected signal source; and control program executing means for selectively executing a control program in the microcomputer corresponding to the control specification constant loaded into the electrically rewritable nonvolatile memory, said control program executing means selectively executes a control program corresponding to a result of the discrimination by the signal characteristic discriminating means only when the electrically rewritable nonvolatile memory is loaded with a given control specification constant.

2. An engine control apparatus including a microcomputer which receives a signal from a signal source, the apparatus comprising:

a signal input circuit selectively connectable with signal sources of plural types;

memory means for storing control programs corresponding to the signal sources of the plural types respectively;

an electrically rewritable nonvolatile memory loaded with a control specification constant indicating a signal source connected with the signal input circuit, said electrically rewritable nonvolatile memory comprising an EEPROM; and control program executing means for selectively executing a control program in the microcomputer corresponding to the control specification constant loaded into the electrically rewritable nonvolatile memory.

3. The engine control apparatus of claim 2, further comprising a communication circuit for receiving the control specification constant loaded into the electrically rewritable nonvolatile memory from an external source.

4. The engine control apparatus of claim 2, wherein the memory means comprises a mask ROM.

5. The engine control apparatus of claim 2, further comprising a signal characteristic discriminating means for discriminating a characteristic of a signal from the connected signal source, and wherein the control program executing means selectively executes a control program in the microcomputer corresponding to the control specification constant loaded into the electrically rewritable nonvolatile memory and a result of the discrimination by the signal characteristic discriminating means.

6. The engine control apparatus of claim 2, wherein the memory means stores a first control program and a second control program, the first control program forming an independent control system for controlling a controlled object in response to a sensor signal, the second control program forming a dependent control system for controlling a controlled object in response to a command signal from another control apparatus; and wherein the control program executing means selectively executes the first control program and the second control program in response to the control specification constant loaded into the electrically rewritable nonvolatile memory.

7. An engine control apparatus including a microcomputer which receives a signal from a signal source, the apparatus comprising:

a signal input circuit selectively connectable with signal sources of plural types;

memory means for storing control programs corresponding to the signal sources of the plural types respectively;

signal source identifying means for identifying a signal source connected with the signal input circuit, said signal source identifying means comprising an electrically rewritable nonvolatile memory loaded with a control specification constant indicating the connected signal source, and a signal characteristic discriminating means for discriminating a characteristic of the signal from the connected signal source; and control program executing means for selectively executing a control program in the microcomputer corresponding to the signal source identified by the signal source identifying means, said control program executing means selectively executing a control program corresponding to a result of the discrimination by the signal characteristic discriminating means only when the electrically rewritable nonvolatile memory is loaded with a given control specification constant.

8. The engine control apparatus of claim 1, wherein the memory means stores a first control program and a second control program, the first control program forming an independent control system for controlling a controlled object in response to a sensor signal, the second control program forming a dependent control system for controlling a controlled object in response to a command signal from another control apparatus; and wherein the control program executing means is operative for selectively executing the first control program and the second control program in response to the control specification constant stored into the electrically rewritable nonvolatile memory.

9. The engine control apparatus of claim 1, wherein means for discriminating a pressure sensor and an octane number sensor is activated only when the electrically rewritable nonvolatile memory is loaded with the given control specification constant.

10. The engine control apparatus of claim 1, wherein the signal source identifying means comprises signal characteristic discriminating means for discriminating a characteristic of the signal from the connected signal source.

11. The engine control apparatus of claim 1, wherein the signal sources of plural types are comprised of a pressure switch, and octane number switch, a knock detector, and a fuel control ECU.

12. The engine control apparatus of claim 1, further comprising a waveform shaping circuit for generating a rotation pulse signal having pulses spaced at equal angle intervals corresponding to rotation of cylinders in a controlled engine, said control program selectively executed by the microcomputer being iteratively executed in response to said pulses.

13. The engine control apparatus of claim 1, further comprising a spark control circuit responsive to a result of the control program selectively executed by the microcomputer, for controlling spark timing in a controlled engine.

14. The engine control apparatus of claim 13, wherein the signal received from the signal source contains a control factor, said control factor being used by the control program selectively executed by the microcomputer to calculate the result used by the spark control circuit.

* * * * *